US012661645B2

(12) United States Patent
Park et al.

(10) Patent No.: US 12,661,645 B2
(45) Date of Patent: Jun. 23, 2026

(54) MINI-PIPETTE

(71) Applicant: BODITECH MED INC., Gangwon-Do (KR)

(72) Inventors: Sang Hyun Park, Seoul (KR); Byeong Chul Kim, Gangwon-Do (KR)

(73) Assignee: BODITECH MED INC., Gangwon-Do (KR)

( * ) Notice: Subject to any disclaimer, the term of this patent is extended or adjusted under 35 U.S.C. 154(b) by 784 days.

(21) Appl. No.: 17/923,681

(22) PCT Filed: Sep. 13, 2021

(86) PCT No.: PCT/KR2021/012425
§ 371 (c)(1),
(2) Date: Nov. 7, 2022

(87) PCT Pub. No.: WO2022/060037
PCT Pub. Date: Mar. 24, 2022

(65) Prior Publication Data

US 2023/0173478 A1 Jun. 8, 2023

(30) Foreign Application Priority Data

Sep. 18, 2020 (KR) ........................ 10-2020-0120217

(51) Int. Cl.
*B01L 3/02* (2006.01)

(52) U.S. Cl.
CPC ..... *B01L 3/0224* (2013.01); *B01L 2200/0605* (2013.01); *B01L 2300/14* (2013.01); *B01L 2400/0487* (2013.01)

(58) Field of Classification Search
CPC ........... B01L 3/0224; B01L 2200/0605; B01L 2300/14; B01L 2400/0487
See application file for complete search history.

(56) References Cited

U.S. PATENT DOCUMENTS 4,096,751 A 6/1978 Withers et al.
5,012,682 A 5/1991 Sabloewski
(Continued)

FOREIGN PATENT DOCUMENTS

CA 2404717 C 11/2009
CN 204900350 U 12/2015
(Continued)

OTHER PUBLICATIONS

International Search Report issued by ISA/KR in connection with PCT/KR2021/012425 dated Mar. 24, 2022.
(Continued)

*Primary Examiner* — Charles Capozzi
*Assistant Examiner* — Alex Ramirez
(74) *Attorney, Agent, or Firm* — Klintworth & Rozenblat LLP

(57) ABSTRACT

The present invention relates to a mini-pipette, and more particularly, to a mini-pipette which has capacity varying means that can vary the movement distance of a push button reciprocating in the outer body to generate suction force so that a variety of samples can be easily collected. The present invention provides a mini-pipette comprising: an outer body having a hollow movement space and a suction passage formed at a lower part of the outer body; a push button for generating negative or positive pressure in the suction passage while reciprocating in the movement space of the outer body; elastic means for elastically supporting the push button in the movement space; and a capacity varying means formed inside the outer body, for varying a movement distance of the push button in the movement space.

5 Claims, 12 Drawing Sheets

(56) References Cited

U.S. PATENT DOCUMENTS

| | | | | |
|---|---|---|---|---|
| 5,849,248 | A | 12/1998 | Homberg | |
| 2004/0035228 | A1 | 2/2004 | Viot | |
| 2016/0228868 | A1* | 8/2016 | Sanchez | B01L 3/0224 |
| 2016/0303557 | A1 | 10/2016 | Lacroix | |

FOREIGN PATENT DOCUMENTS

| | | | |
|---|---|---|---|
| GB | 2029723 | A | 3/1980 |
| JP | 2011-000490 | A | 1/2011 |
| JP | 2018512261 | A | 5/2018 |
| KR | 100687591 | B1 | 2/2007 |
| KR | 101306517 | B1 | 9/2013 |
| KR | 20170062465 | A | 6/2017 |

OTHER PUBLICATIONS

Written Opinion of the ISA issued by ISA/KR in connection with PCT/KR2021/012425 dated Mar. 24, 2022.

* cited by examiner

MINI-PIPETTE

This is a National Stage Application of International Patent Application No. PCT/KR2021/012425 filed Sep. 13, 2021, which claims the benefit of and priority to Korean Application No. 10-2020-0120217 filed Sep. 18, 2020, the entirety of which are incorporated fully herein by reference.

FIELD OF THE INVENTION

The present invention relates to a mini-pipette, and more particularly, to a mini-pipette in which the movement distance of a push button is varied so that a variety of samples can be easily collected while varying the movement distance.

BACKGROUND OF THE INVENTION

Various chemical or biochemical assays for measuring bio-markers related to specific diseases, general health conditions, infections or the like are generally performed through multi-step chemical reactions and physical manipulations using various reagents and instruments. For example, when detecting a specific chemical substance contained in a sample such as blood or a biochemical substance such as a protein, it requires several steps of physical manipulation: collecting the sample, putting it in a specific container to react with one or more reagents, removing the sample from the container and then dispensing the reacted sample.

When the sample to be analyzed (eg. blood), a detection antibody labeled with a fluorescent substance, etc., and whole blood are used, a solution (reagent) containing a reagent for erythrocyte lysis is mixed at a quantitative ratio to be reacted. And then, the sample is loaded into the sample pad of the analysis device or the cartridge so to carry out the analysis. In this case, accurate and reproducible analysis is possible only when an accurate quantification (usually 50 µl to 150 µl) of the sample is loaded. Therefore, in order to obtain the accurate and reproducible results, it is important to measure and use the correct volume in each of the steps described above. In this process, a pipette is usually used in order to measure the volume.

A pipette is a side vessel used to precisely measure and transport a small amount of liquid in chemical experiments, biology and medicine. A micro-pipette is used to inhale or dispense an extremely small amount of liquid with a volume of 1 to 1000 µl (microliters), and these micro-pipettes are used as essential instruments in molecular biology experiments.

As shown in FIG. 1, the pipette consists of a tip 2 having a suction chamber 1 through which the sample is sucked, a piston 4 installed in a body 3 so as to generate a suction force into the suction chamber 1 during its rectilinear movement, and a spring 5 that provides an elastic force to the rectilinear movement of the piston 4.

In order for a user to collect a sample using the pipette having such a configuration, the user presses a knob 6 formed on the upper portion of the piston 4 to lower the piston 4 and brings the pipette to the sample. And then, when the knob 6 is released, the piston 4 rises due to the restoring force of the spring 5 and creates a negative pressure in the suction chamber 1. Accordingly, the sample is collected while being sucked into the suction chamber 1. Thereafter, the user brings the pipette to the sample pad of the analysis device or cartridge and presses the knob 6 to create positive pressure in the suction chamber 1, so that the sample in the suction chamber 1 is transferred to and loaded on the sample pad of the analysis device or cartridge. Thereafter, the user carries out a series of sample analysis.

On the other hand, the conventional pipette has a problem in that the sample collection amount cannot be controlled. That is, the sample collection amount may vary depending on the analysis target. Since it is difficult to control the sample collection amount with one pipette, different types of pipettes with different volumes of the suction chamber 1 must be used in order to vary the sample collection amounts. Accordingly, it is inconvenient for the user to have to use a separate pipette suitable for each of the amounts of sample to be taken. And, since it is necessary to manufacture pipettes for each different amount of sample, it is expensive to produce the conventional pipettes.

PRIOR ART LITERATURE

Patent Literature (Patent Literature 1) Korea Publication 10-2017-0062465

TECHNICAL CHALLENGE

Figure 1:
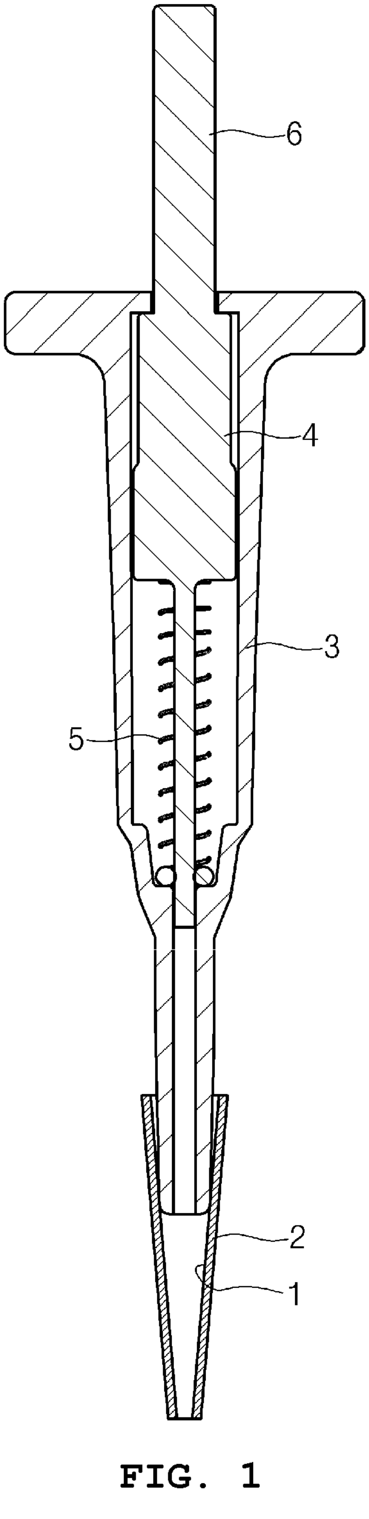
FIG. 1 shows a cross-sectional view of a conventional mini-pipette.

The present invention has been devised to solve the above problems, and the present invention provides a mini pipette that enables to control the movement distance of the push button in the out body of the hollow so as to adjust the suction capacity according to the movement distance of the push button, so that it enables to easily collect a variety of amounts of samples through one outer body thereof.

TECHNICAL SOLUTIONS

The present invention for achieving the above-mentioned objectives provides a mini-pipette comprising: an outer body having a hollow movement space and a suction passage formed at a lower part of the outer body; a push button for generating negative or positive pressure in the suction passage while reciprocating in the movement space of the outer body; elastic means for elastically supporting the push button in the movement space; and a capacity varying means formed inside the outer body, for varying a movement distance of the push button in the movement space.

Preferably, the capacity varying means is formed of interference protrusions protruding from the inner circumferential surface of the outer body toward the movement space so to work with the push button, wherein provided is at least one interference protrusion aligned in the height direction of the outer body.

Preferably, the push button comprises: an inner body corresponding to the inner diameter of the movement space, and formed to have a plane length that is greater than the distance between the interference protrusions and a plane length that is smaller than the distance between the interference protrusions; a press part formed extending outwardly from one end of the inner body, having a outer diameter smaller than the outer diameter of the inner body, and exposed outside the outer body; and a guide part extending outwardly from the other end of the inner body and guided along the suction passage, wherein an upper inner step formed due to the diameter difference between the inner body and the press part is caught in the interference protrusion so to limit the movement distance of the push button.

Preferably, the outer body is divided into a lower outer body having a suction passage and an upper outer body having an entrance through which a part of the push button enters and exits, wherein the interference protrusion is formed at the upper outer body.

Preferably, the upper outer body can be rotated based on the lower outer body or the push button can be installed to be rotated in the movement space.

EFFECTS OF THE INVENTION

A mini-pipette according to the present invention is configured to enable to vary the movement distance of the push button in the out body of the hollow so as to vary the suction capacity according to the movement distance of the push button. It enables to easily collect a variety of amounts of samples through one outer body thereof. That is, the mini-pipette enables to collect a variety of amount of samples with one outer body thereof. Accordingly, the mini-pipette can collect samples in various amounts through a simple operation, and furthermore, it is possible to reduce the mini-pipette manufacturing cost because it is not necessary to separately manufacture mini-pipettes for each of the sample collection amounts.

DETAILED DESCRIPTION OF EXEMPLARY EMBODIMENT OF THE INVENTION

Hereinafter, the terms or vocabulary used in the present specification and claims are not to be construed as limited in their ordinary or dictionary meanings, and on the principle that the inventor can appropriately define the concept of the term in order to best describe his invention, they should be interpreted as meaning and concept consistent with the technical idea of the present invention.

Hereinafter, a mini-pipette according to a preferred embodiment of the present invention will be described with reference to FIGS. 2 through 8B.

The mini-pipette allows the sample collection capacity to be varied with a single pipette. Accordingly, the mini-pipette does not require the use of thin pipettes of different volumes or tip replacement to vary the sample collection volume, thus enhancing the convenience for sample collection. And, since there is no need to separately manufacture mini-pipettes for each of various capacities, the cost of manufacturing mini-pipettes can be reduced.

Figure 2:
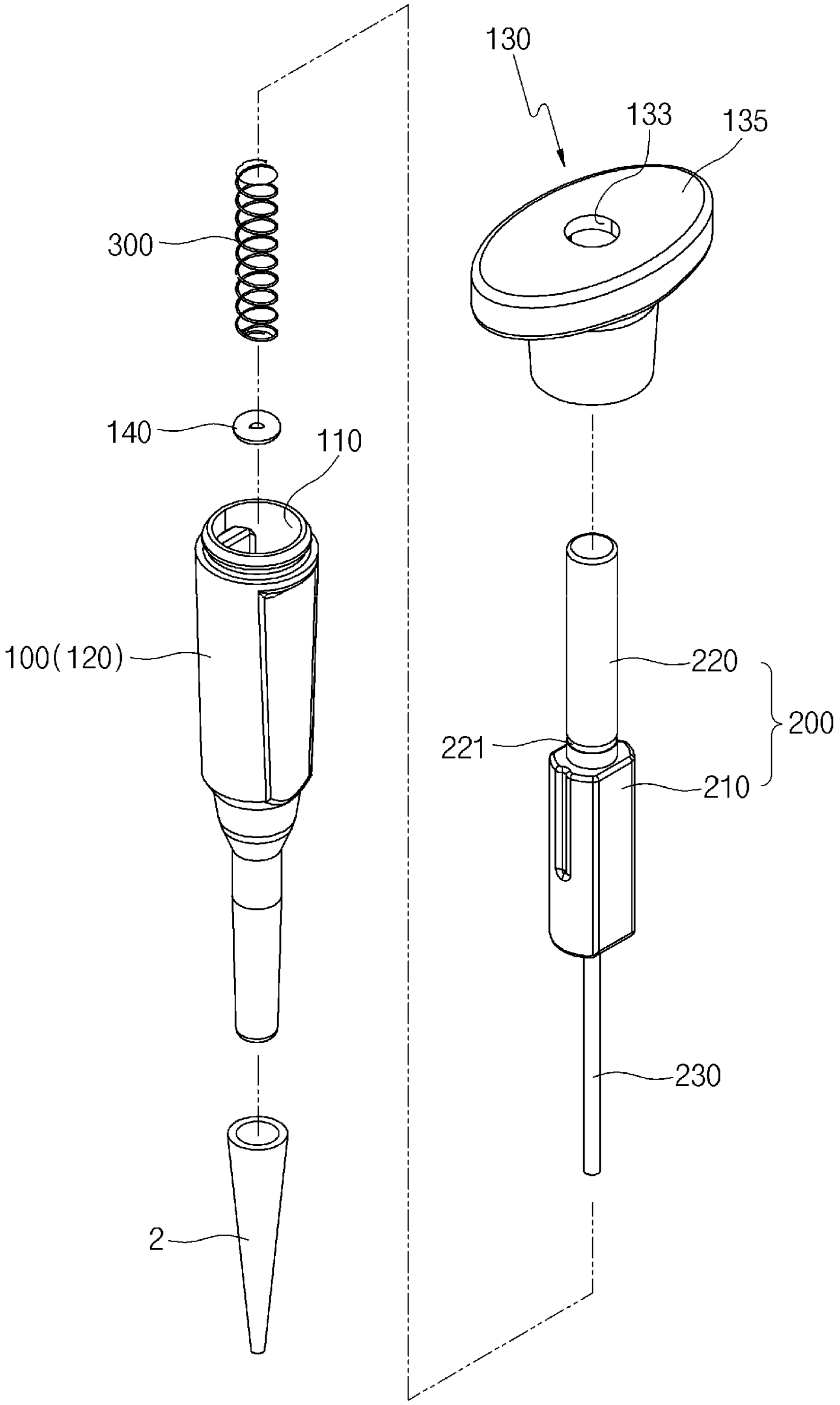
FIG. 2 shows an exploded perspective view of a mini-pipette according to a preferred embodiment of the present invention.
Figure 3A:
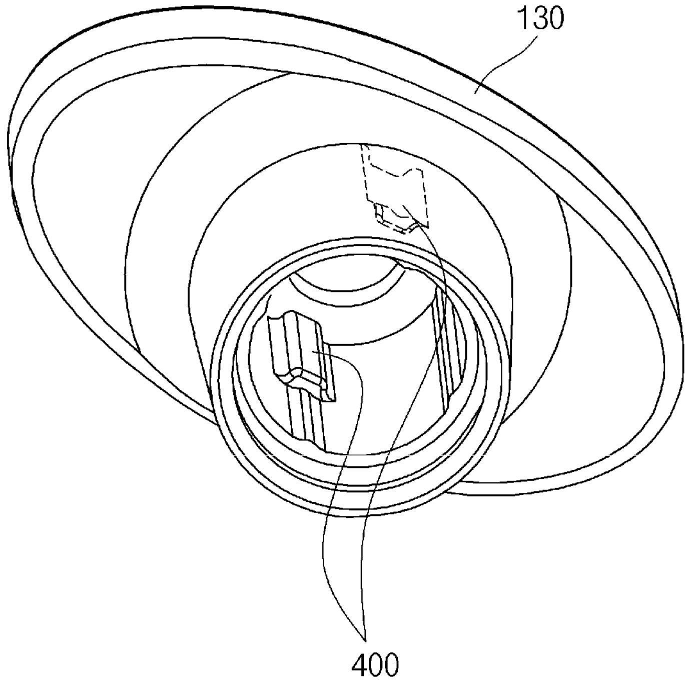
FIG. 3A shows a bottom perspective view of a part cut out of the upper outer body of a mini pipette according to a preferred embodiment of the present invention by cutting the part.
Figure 3B:
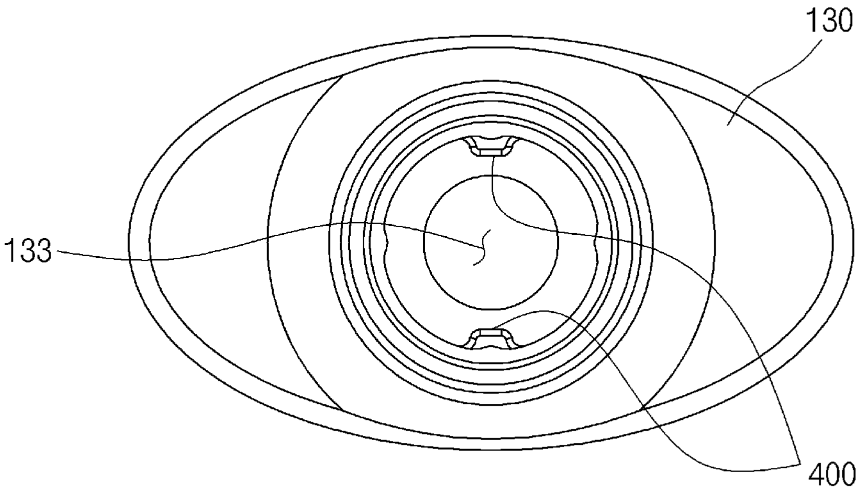
FIG. 3B shows a bottom view of the upper outer body of the mini-pipette according to a preferred embodiment of the present invention.
Figure 4:
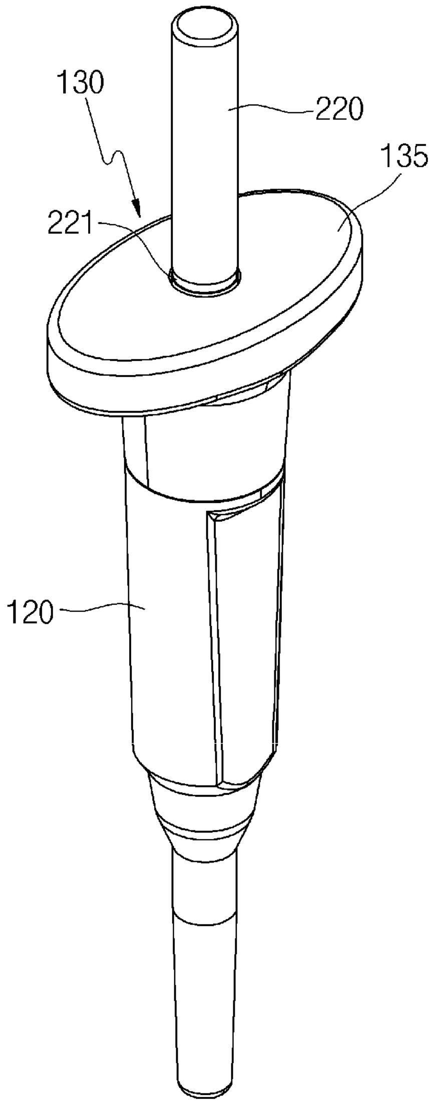
FIG. 4 shows a perspective view of a mini-pipette according to a preferred embodiment of the present invention.

A mini-pipette (hereinafter, referred to as a 'pipette') includes an outer body 100, a push button 200, an elastic means 300, and a capacity varying means 400, as shown in FIGS. 2 through 4.

Figure 5A:
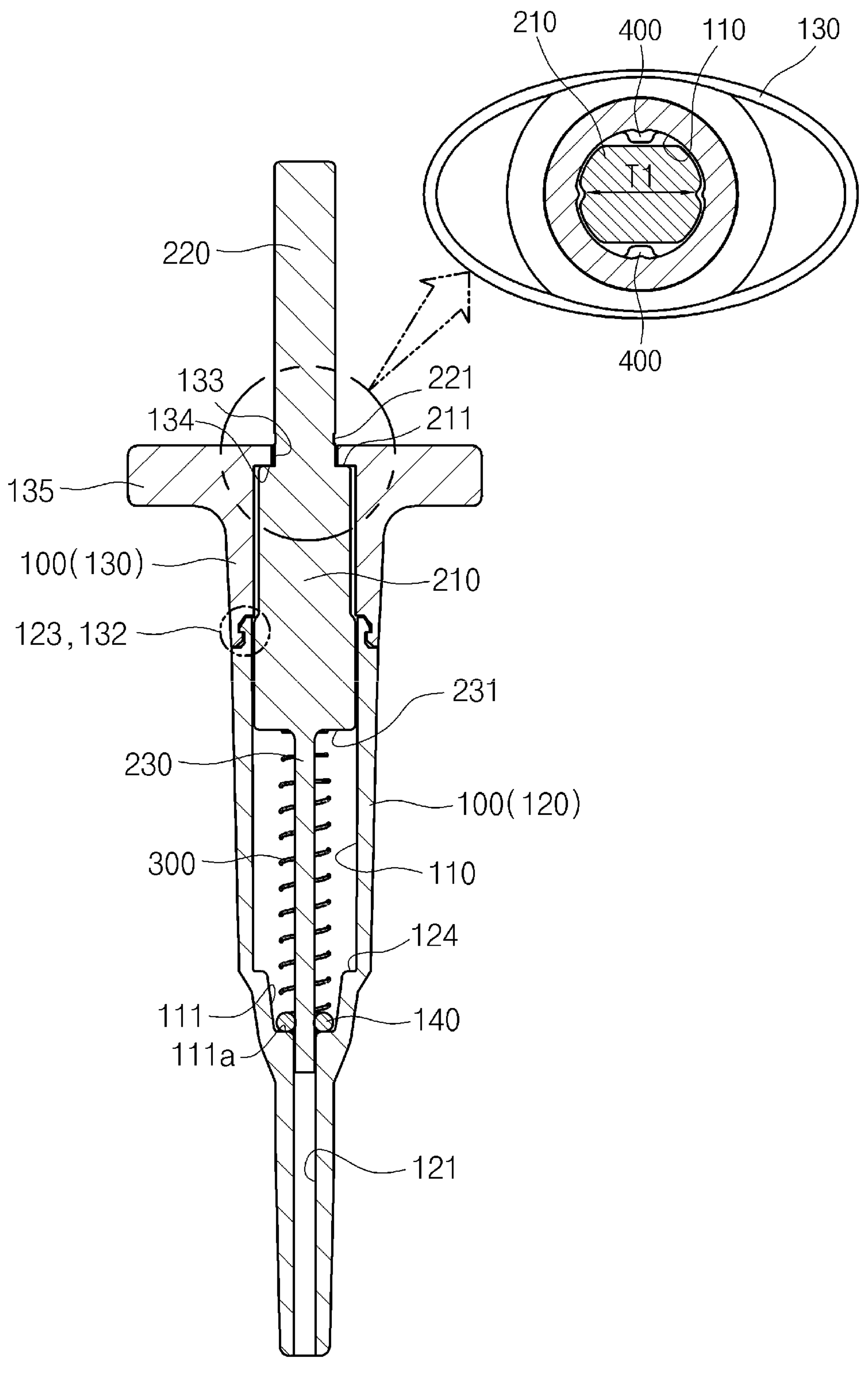
FIGS. 5A through 6B show cross-sectional views of a mini-pipette with its varied movement distance of a push button changed through a capacity varying means according to a preferred embodiment of the present invention.

The outer body 100 constitutes the exterior of the pipette, and forms a hollow movement space 110 in which the push button 200 can reciprocate. It is preferable that the outer body 100 is divided as shown in FIG. 2 rather than integrally formed. The outer body 100 is composed of a lower outer body 120 and an upper outer body 130. The lower outer body 120 is a portion to/from which the tip 2 for sample collection is attached/detached, and as shown in FIG. 5A, the lower outer body 120 forms a suction passage 121 in which a suction force is generated while communicating with a suction chamber 1 of the tip 2. An upper portion of the lower outer body 120 forms an open part 122 for opening the movement space 110, and a coupling means 123 is formed around the open part 122 to be coupled to the upper outer body 130. At this time, a lower outer step 124 is formed in the lower portion of the movement space 110 of the lower outer body 120 so as to limit excessive movement of the push button 200 to be described later as shown in FIG. 5A. The lower outer step 124 is formed between the upper part of the movement space 110 and the enclosed space 111 formed in the lower part of the movement space 110, and the lower outer step 124 is formed in a stepped form because the movement space 110 is formed to have a comparatively larger inner diameter than the inner diameter of the enclosed space 111. The enclosed space 111 is formed to communicate with the suction passage 121, and the lower portion of the enclosed space 111 forms a fixed threshold 111*a* because the enclosed space 111 is formed to have a comparatively larger inner diameter than the inner diameter of the suction passage 121. At this time, an O-ring 140 is positioned at the fixed threshold 111*a* so as to maintain the air tightness of the suction passage 121 and the enclosed space 111.

The upper outer body 130 comprises the upper part of the outer body 100, and is provided to be coupled to the lower outer body 120. The upper outer body 130 forms a hollow movement space 110, and its lower portion forms an open part 131 for opening the movement space 110. The movement space 110 of the upper outer body 130 corresponds to the movement space 110 of the lower outer body 120, and a coupling means 132 is formed by which the open part 131 of the upper outer body 130 is coupled to the open part 122 of the lower outer body 120. In addition, an entrance 133 is formed on the upper outer body 130 so that the push button 200 can be exposed. The entrance 133 is formed on the opposite side of the open part 131 of the upper outer body 130, and is configured to expose a part of the push button 200 to the outside of the upper outer body 130 so that the user can press the push button 200 by pushing it. The entrance 133 is formed to have a comparatively smaller inner diameter than the inner diameter of the movement space 110, so that the upper outer step 134 is formed at the upper part of the movement space 110 of the upper outer body 130.

Meanwhile, the coupling means 123 and 132 are not particularly specified, but may be provided as hooks for coupling upward and downward alternately to each other as shown in FIG. 5A. That is, it is preferable that the coupling means 123 and 132 are provided so that the lower outer body 120 and the upper outer body 130 can be fitted. At this time, the upper outer body 130 is coupled to be rotated based on the lower outer body 120. That is, the open part 131 of the upper outer body 130 is installed so as to be rotated along the circumference of the open part 122 of the lower outer body 120. it is preferred that a handle 135 is formed on the upper outer body 130 so that a user can easily rotate the upper outer body 130. The handle 135 is provided in the form of a protrusion extending outward from both sides of the upper outer body 130.

The push button 200 generates negative or positive pressure to suck the sample to be collected or to discharge the sucked sample to the analysis device. The push button 200 is installed so as to reciprocate in the movement space 110 of the outer body 100. As shown in FIG. 2, the push button 200 includes an inner body 210, a press part 220, and a guide part 230. The inner body 210 is configured to generate negative or positive pressure in the suction passage 121 while reciprocating in the movement space 110. The outer diameter of the inner body 210 corresponds to the inner diameter of the movement space 110 so that the inner body 210 can freely move in the movement space 110, and as shown in FIG. 2, the facing surface has a short side and a long side so that it looks rectangular or oval in the plane view aspect. That is, the inner body 210 corresponds to the inner diameter of the movement space 110, and is formed to have a plane length (long side: T1) that is greater than the distance between the interference protrusions which will be described later, and a plane length (short side: T2) that is smaller than the distance between the interference protrusions.

The press part 220 of the push button 200 is configured so that the user may control the movement of the inner body 210, and is exposed to the outside of the outer body 100 through the entrance 133. The press part 220 is formed to have an outer diameter smaller than the outer diameter of the inner body 210, and it is provided to be small enough to enter and exit the movement space 110 through the entrance 133. Accordingly, due to the difference between the outer diameter of the inner body 210 and the outer diameter of the press part 220, an upper inner step 211 is formed in the upper part of the inner body 210, and the upper inner step 211 can be hung and supported by an upper outer step 134 of the outer body 100 or an interference protrusion to be described later. As described above, when the body 220 is viewed in a plan view, the body 220 is formed so that the length facing one side and the length facing the other side may have different lengths. So, the upper inner step 211 also has different lengths for each part. In addition, marker 221 is formed around the press part 220. The marker 221 is configured for user to recognize the highest point of the press part 220, and the user can recognize how much the sample is collected depending on whether the marker 221 is exposed outside the upper outer body 130. A detailed description thereof will be provided later. The shape of the marker 221 is not particularly specified, and the marker 221 is made as an intaglio around the press part 220 and may be colored. Numerical values may be also provided as a printed scale. It is preferable that there are provided at least one marker 221 aligned in the height direction of the press part 220. The guide part 230 guides the movement of the inner body 210 and extends from the lower part of the inner body 210. The outer diameter of the guide part 230 corresponds to the inner diameter of suction passage 121, and the guide part 230 moves along suction passage 121. Due to the configuration of the guide part 230 as described above, a stepped lower inner step 231 is formed between the inner body 210 and the guide part 230, and the lower inner step 231 can be caught and supported by the lower outer step 124.

The elastic means 300 provides elastic force to the reciprocating movement of the push button 200 in the movement space 110, and is installed in the movement space 110. The contracted elastic means 300 restores to push the push button 200 in the opposite direction so to create a negative pressure in suction passage 121 when the user pressed and then releases the push button 200. The elastic means 300 is preferably provided as a coil spring. The elastic means 300 is interposed between the O-ring 140 and the lower outer step 124 of the push button 200 as shown in FIG. 5A.

The capacity varying means 400 is configured to vary the movement distance of the push button 200 so as to control the amount of sample suction according to the varied movement distance.

That is, when the user presses the push button 200 to contract the spring 300 and then releases the contraction of the spring 300, the spring 300 restores and moves the push button 200 in the opposite direction so that a sample may be taken into the inside of the tip 2 due to the suction force generated by the push button 200 that moves in the opposite direction. The capacity varying means 400 increases or decreases the movement distance of the push button 200 so as to control the amount of sample collection. The capacity varying means 400 is preferably provided as an interference protrusion capable of working with the upper inner step 211 formed on the inner body 210 of the push button 200. The interference protrusion 400 protrudes from the inner circumferential surface of the outer body 100 toward the movement space 110, and preferably protrudes from the inner circumferential surface of the upper outer body 130 as shown in FIGS. 3A and 3B. The interference protrusion 400 is preferably formed on both sides of the inner circumferential surface of the upper outer body 130, and it is preferable that at least one interference protrusion 400 is formed to be aligned in the height direction of the upper outer body 130. In the present specification, for convenience of description, one interference protrusion 400 is exemplified to be aligned in the height direction of the upper outer body 130, but a plurality of interference protrusions 400 may be provided. in this case, the number of interference protrusions 400 aligned in the height direction of the upper outer body 130 should correspond to the number of markers 221 formed in the press part 220.

Hereinafter, a process of collecting a sample by varying a sample collection amount using a mini-pipette that has the above configuration will be described with reference to FIGS. 5A through 8B.

For better understanding of the description, the process of collecting a sample of 75 μl and a sample of 50 μl with one mini-pipette will be described.

Figure 7A:
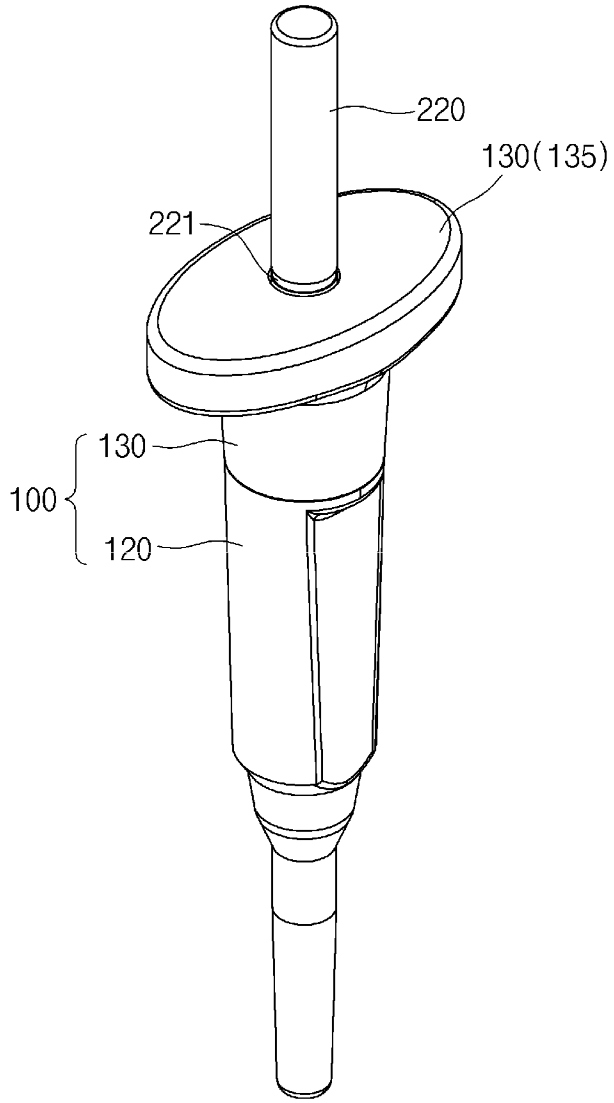
FIGS. 7A to 8B show external perspective views of a mini pipette with its varied movement distance of the push button changed through a capacity varying means according to the preferred embodiment of the present invention.

FIGS. 5A, 5B, 7A, and 7B show that the mini-pipette acts to collect a sample of 75 μl. As shown in FIGS. 5A and 7A, the marker 221 is exposed above the upper outer body 130. At this time, by means of the color or scale of the marker 221, the user can recognize how much sample the mini-pipette collects.

Figure 5B:
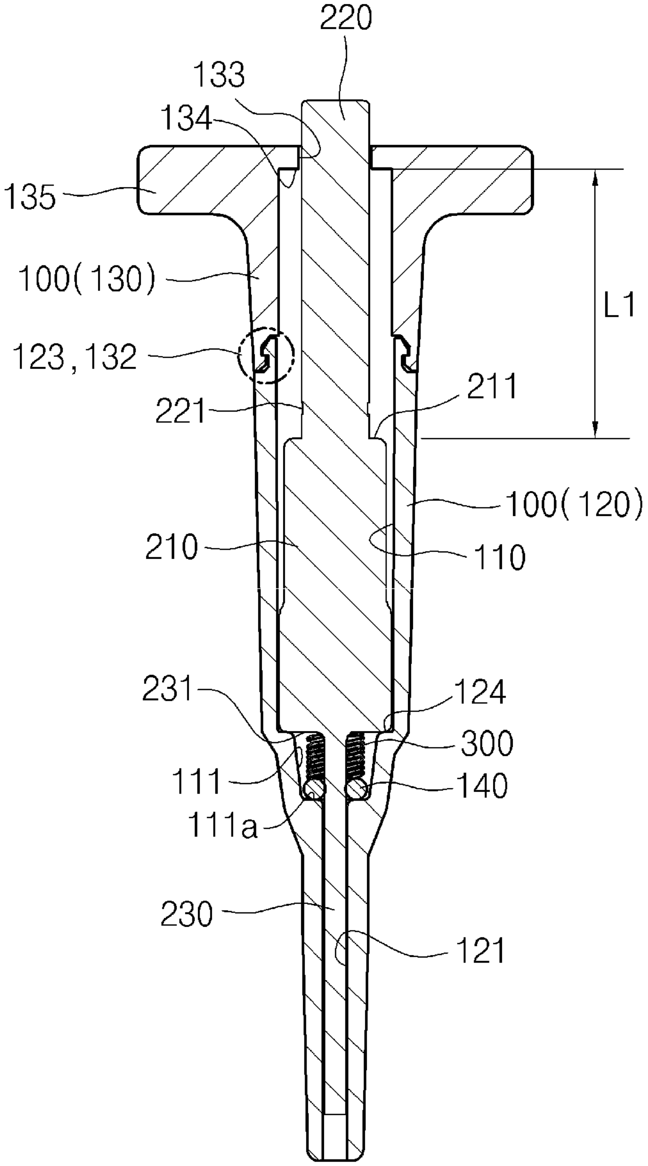
Figure 7B:
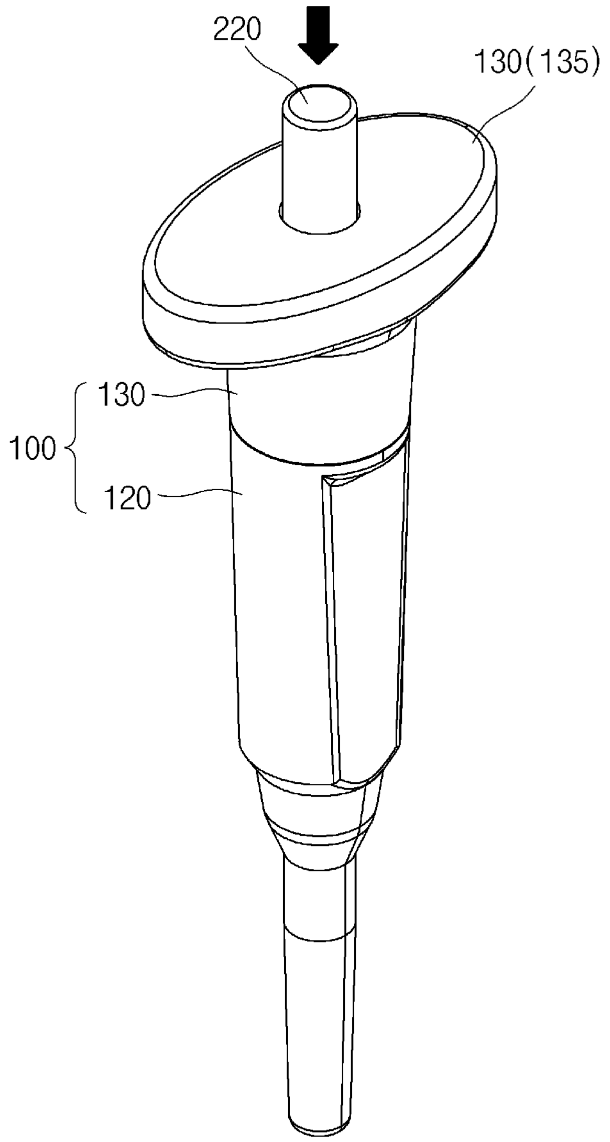

Thereafter, the user presses the press part 220 of the push button 200. At this time, as shown in FIGS. 5B and 7B, the push button 200 gets lowered until the lower inner step 231 of the inner body 210 is caught by the lower outer step 124 and stops. And the movement distance L1 of the inner body 210 is the distance between the upper outer step 134 and the upper inner step 211 when the lower inner step 231 of the inner body 210 reaches the lower outer step 124. Thereafter, when the user puts the tip 2 of the mini-pipette on the sample and then slowly releases the press part 220, the inner body

210 rises due to the restoring force of the spring 300 so to create a suction force in suction passage 121. Accordingly, the sample is sucked into the tip 2, and the sample suction continues during the inner body 210 is rising and the upper inner step 211 is caught and stopped by the upper outer step 134. At this time, as shown in FIG. 5A, the long side T1 of the upper inner step 211, which has a long plane length, is not working with the interference protrusion 400, and the inner body 210 can move to reach the upper outer step 134. in addition, the sample collection amount corresponds to the suction capacity made by the inner body 210 that moved down by the distance L1 and then moved up back by the distance L1. Then, when the sample collection is completed, the user takes the mini-pipette to the analysis device and presses the push button 200 to generate positive pressure in suction passage 121 so to load the sample into the analysis device.

Figure 6A:
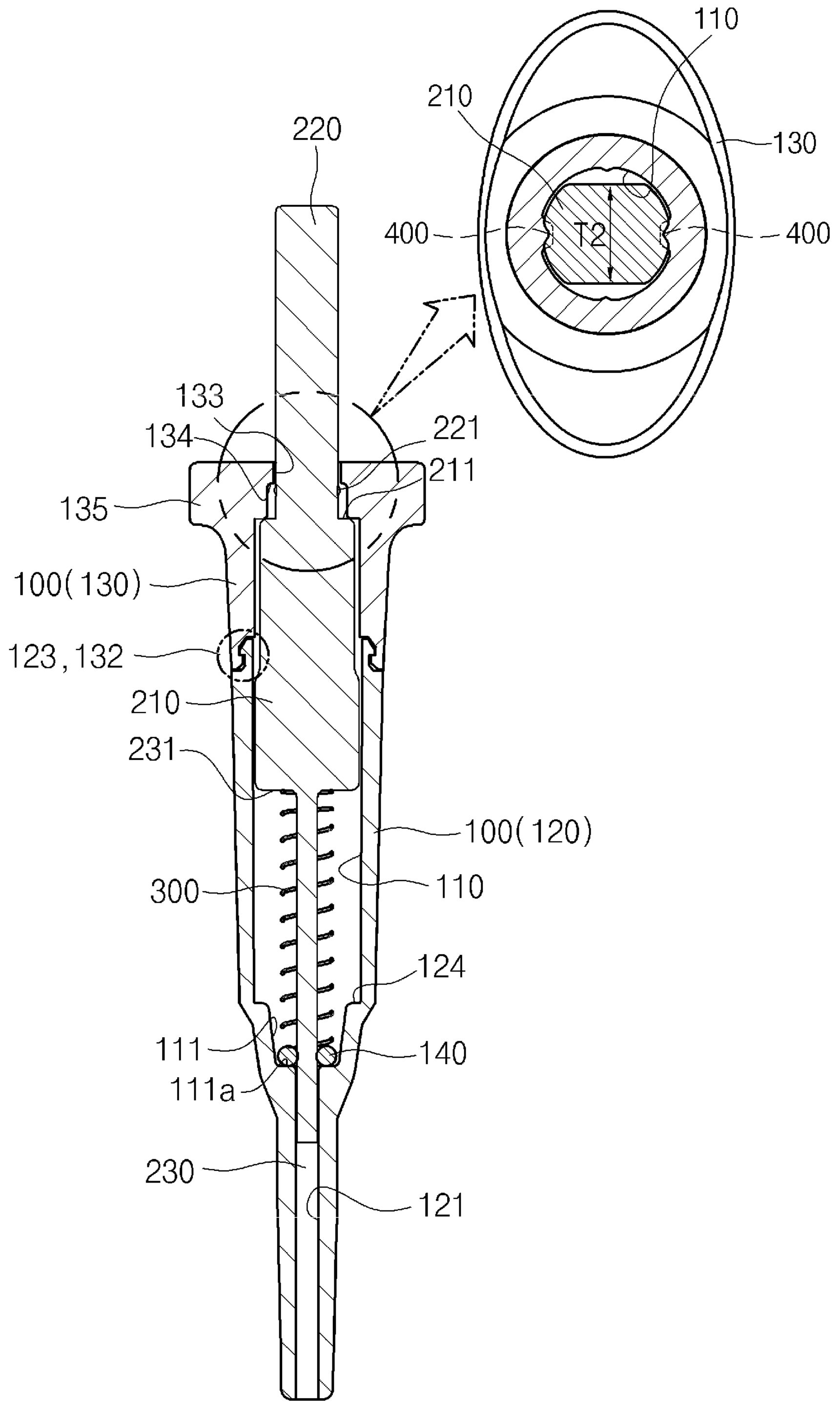
Figure 6B:
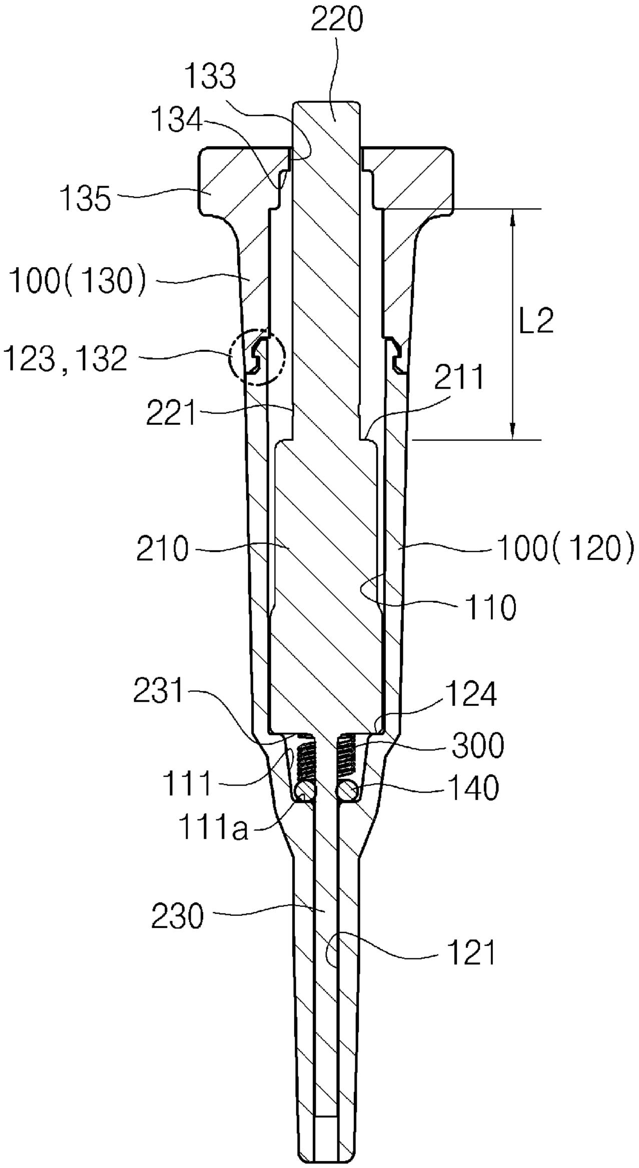
Figure 8A:
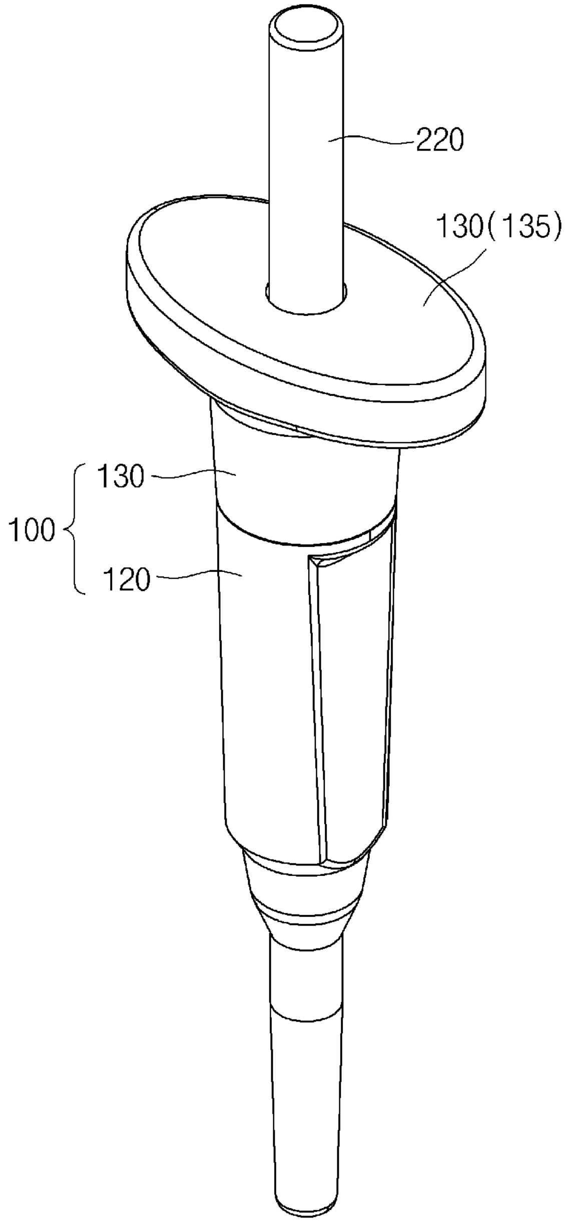

Meanwhile, in order to change the sample collection amount to 50 μl and collect the sample using the aforementioned mini-pipette, the user rotates the upper outer body 130 as shown in FIGS. 7A and 8A. This is to reduce the movement distance of the inner body 210 by making the long side T1 of the upper inner step 211 of the inner body 210 be caught by the interference protrusion 400 as shown in FIG. 6A. Accordingly, the movement distance L2 of the inner body 210 is between the interference protrusion 400 and the lower outer step 124 as shown in FIGS. 6A and 6B. At this time, as described above, the user can rotate the upper outer body 130 so that the interference protrusion 400 may correspond to the long side T1 of the upper inner step 211, which has a long plane length, while the user can rotate the push button 200 so that the long side T1 of the upper inner step 211, which has a long plane length may correspond to the interference protrusion 400.

FIGS. 6*a*, 6*b*, 8*a*, and 8*b* show that the mini-pipette acts to collect a sample of 50 μl. As shown in FIGS. 6*a* and 8*a*, the user sees that the marker 221 is not exposed outside the upper body 130 and can recognize that the sample collection amount is 50 μl. At this time, in the case of alternative sampling as in the embodiment of the present specification, the user can recognize the sample collection amount depending on whether the marker 221 is exposed, but when there are three or more sample collection amount choices, it is desirable that each sample collection amount can be recognized through the exposed marker 221 that has a scale or is multi-colored.

Figure 8B:
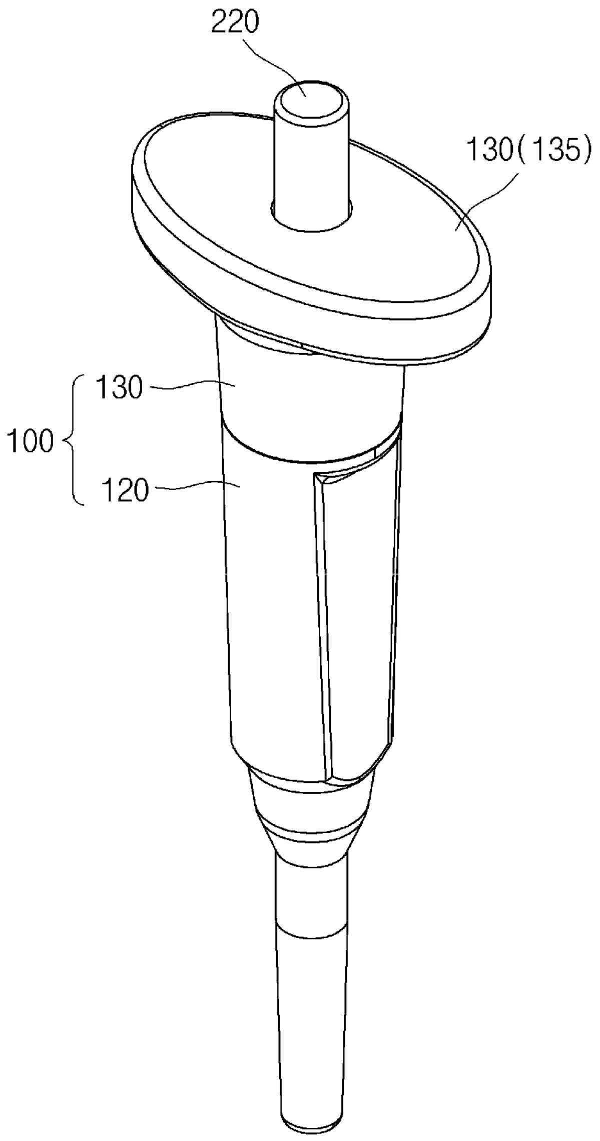

Thereafter, the user presses the press part 220 of the push button 200. At this time, the push button 200 gets lowered until the lower inner step 231 of the inner body 210 is caught and stopped by the lower outer step 124 as shown in FIGS. 6*b* and 8*b*. And the movement distance L2 of the inner body 210 is the distance between the interference protrusion 400 and the upper inner step 211 when the lower inner step 231 of the inner body 210 reaches the lower outer step 124. Thereafter, when the user puts the tip 2 of the mini-pipette on the sample and then slowly releases the press part 220, the inner body 210 rises due to the restoring force of the spring 300 so to generate a suction force in suction passage 121. Accordingly, the sample is sucked into the tip 2, and the sample suction continues until the inner body 210 rises and the upper inner step 211 is caught and stopped by the interference protrusion 400. At this time, the long side T1 side of the upper inner step 211, which has a long plane length, works with the interference protrusion 400 as shown in FIG. 6A, and the inner body 210 can rise to reach the interference protrusion 400. In addition, the sample collection amount corresponds to the suction capacity made by the inner body 210 that moved down by the distance L2 and then moved up back by the distance L2. Then, when the sample collection is completed, the user takes the mini-pipette to the analysis device and presses the push button 200 to generate positive pressure in suction passage 121 so to load the sample into the analysis device.

As described so far, the mini-pipette according to the present invention can varies the movement distance of the push button 200 in the movement space 110 of the outer body 100, so that the suction capacity can be controlled by means of the push button 200. As a result, one mini-pipette can be used to collect the various amounts of samples. Accordingly, because it is not necessary to manufacture mini-pipettes separately for each of the sampling amounts, the production cost can be reduced and the sample collection amount can be easily changed only by rotating the upper outer body 130 or the push button 200.

Although the present invention has been described in detail with respect to the described embodiments, it is apparent to those skilled in the art that various modifications and variations are possible within the scope of the technical spirit of the present invention, and it is natural that such variations and modifications belong to the appended claims.

What is claimed is:

1. A mini-pipette comprising:

an outer body having a hollow movement space and a suction passage formed at a lower part of the outer body;

a push button for generating negative or positive pressure in the suction passage while reciprocating in the movement space of the outer body;

elastic means for elastically supporting the push button in the movement space; and a capacity varying means formed inside the outer body, for varying a movement distance of the push button in the movement space, wherein the capacity varying means comprises at least one interference protrusion aligned in a height direction and protruding from an inner circumferential surface of the outer body toward the movement space, and wherein the push button comprises an inner body having a non-circular cross-section with a first plane length that is greater than a distance between the interference protrusions and a second plane length that is smaller than the distance between the interference protrusions, such that rotation of the push button selectively engages or disengages the inner body with the interference protrusions to provide discrete volumetric settings for precise micro-volume liquid handling.

2. The mini-pipette of claim 1, wherein the inner body further comprises:

a press part formed extending outwardly from one end of the inner body, having an outer diameter smaller than the outer diameter of the inner body, and exposed outside the outer body; and a guide part extending outwardly from the other end of the inner body and guided along the suction passage, wherein an upper inner step formed due to the diameter difference between the inner body and the press part is selectively caught in the interference protrusion depending on a rotational position of the push button to limit the movement distance of the push button.

3. The mini-pipette of claim 1, wherein the outer body is divided into a lower outer body having the suction passage and an upper outer body having an entrance through which a part of the push button enters and exits, wherein the interference protrusion is formed at the upper outer body.

4. The mini-pipette of claim 3, wherein the upper outer body is rotated based on the lower outer body to change an alignment between the interference protrusion and the non-circular cross-section of the inner body.

5. The mini-pipette of claim 1, wherein the non-circular cross-section is rectangular or oval-shaped, and the first plane length and second plane length correspond to different dimensions of the non-circular cross-section.

* * * * *